March 22, 1927.

E. Q. MOSES ET AL 1,621,995

INDICATING DEVICE

Filed July 26, 1916    4 Sheets-Sheet 1

E. Q. Moses,
G. E. Terwilliger
and W. P. Hammond.
Inventors

By their Attorney
G. E. Terwilliger

March 22, 1927.

E. Q. MOSES ET AL

1,621,995

INDICATING DEVICE

Filed July 26, 1916   4 Sheets-Sheet 2

E. Q. Moses,
G. E. Terwilliger, Inventors
and W. P. Hammond.
By their Attorney
G. E. Terwilliger March 22, 1927.

E. Q. MOSES ET AL 1,621,995

INDICATING DEVICE

Filed July 26, 1916

Inventors
E. Q. Moses,
G. E. Terwilliger
and W. P. Hammond.

By their Attorney

G. E. Terwilliger

March 22, 1927.

E. Q. MOSES ET AL 1,621,995

INDICATING DEVICE

Filed July 26, 1916    4 Sheets-Sheet 4

Inventors
E. Q. Moses,
G. E. Terwilliger
and W. P. Hammond.
By their Attorney
G. E. Terwilliger Patented Mar. 22, 1927.

1,621,995

UNITED STATES PATENT OFFICE.

EDMUND QUINCY MOSES, OF NEW YORK, N. Y.; GERALD E. TERWILLIGER, OF NEWARK, AND WILLIAM P. HAMMOND, OF PASSAIC, NEW JERSEY; LAURA E. M. TERWILLIGER, EXECUTRIX OF SAID GERALD E. TERWILLIGER, DECEASED.

INDICATING DEVICE.

Application filed July 26, 1916. Serial No. 111,475.

This invention relates to indicating devices and is particularly applicable to devices for indicating directly the mileage attained by a vehicle per unit of consumption of fuel, or the like, required to propel the vehicle. For instance, in connection with motor vehicles of all sorts, and particularly automobiles, it is highly desirable for the driver to ascertain directly the number of miles which the car is being propelled by a unit quantity of the propelling agent, and in that type of automobiles driven by internal combustion motors it is customary to express this in miles per gallon of fuel.

An indication of this kind is highly desirable as showing economy of performance and as providing a means by which the proper adjustment and functioning of the power plant and its auxiliaries may be determined. For example, in an internal combustion engine, the device will form a very useful aid in securing the correct adjustment of the carburetor, proper timing of ignition, or other adjustment. It will also serve as a check on the quality of the fuel. The invention is obviously applicable to various uses and may be employed in connection with engines other than those of vehicles so as to indicate the consumption of fuel as compared with some other factor than mileage, such as the number of revolutions of the engine.

Among the objects of our invention are the provision of an efficient, accurate indicating device of the above character, the provision of an indicating device operated in connection with fuel-feeding means, and the employment of elements of the fuel-feeding devices as means for operating or controlling an indicator showing the total consumption of fuel as well as a comparative indicator for showing the consumption of fuel relatively to some other factor.

Other objects will appear from the nature of the invention as more fully explained in the following description of certain preferred embodiments thereof.

We have therefore in the accompanying drawings and in this specification shown and described our invention as applied to a device which indicates directly miles per gallon of gasolene consumed in a motor car propelled by an internal combustion gasolene engine. But it will be appreciated that our invention is of far wider scope and is not necessarily limited to this application of the basic inventive thought.

It is not only desirable that the owner or driver of a motor car know the mileage being obtained from a given quantity of fuel, merely as a matter of general interest, but the provision of some means for readily ascertaining this mileage is also highly important as a check upon the adjustment of the various parts of the driving mechanism, such, for instance, as the carbureter, and is not only an aid to the proper setting of such device, but is an indication of the efficient or inefficient operation of the machine, and is highly useful in telling the operator of the car when further adjustments are necessary or when repairs are desirable, such for instance as the removal of carbon from the cylinders, the grinding of the valves, and the refitting of pistons.

In the accompanying drawings which form a part of this specification.

Figure 1:
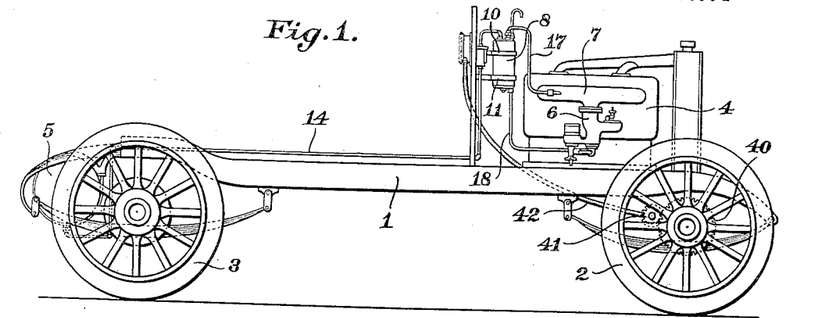
Figure 1 is a side elevation of a motor car provided with an internal combustion engine and equipped with our improved device, the car for clearness being shown stripped, with the body removed.
Figures 2, 3, 4:
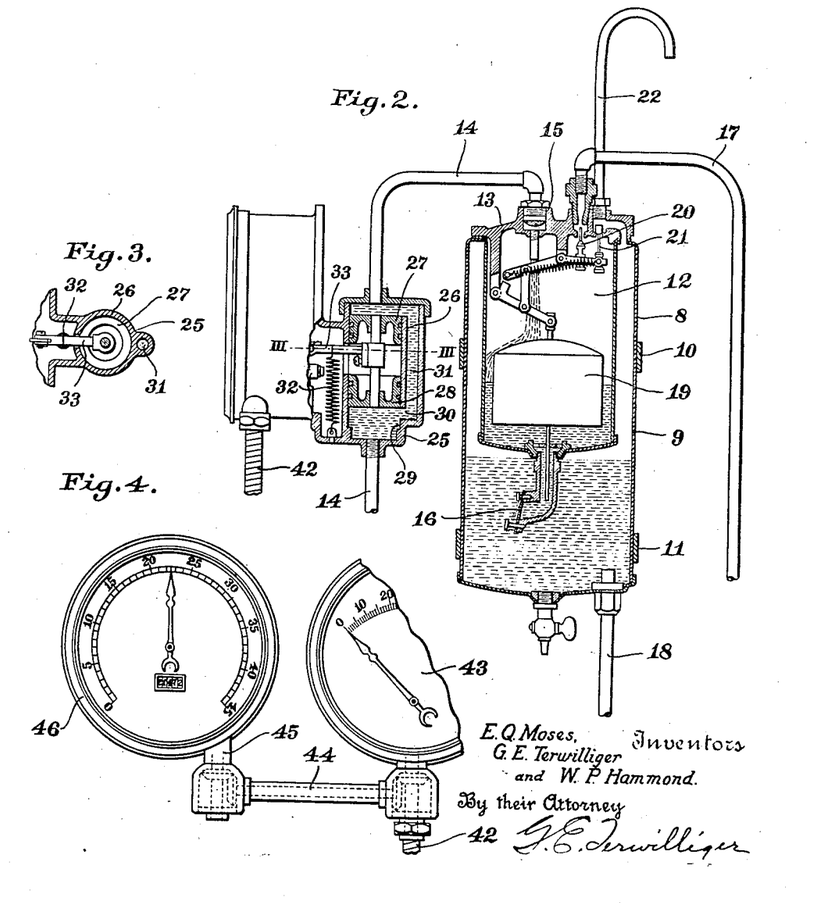
Figure 2 is a side elevation, parts being shown in central section, illustrating one type of our improved device.
Figure 3 is a fragmentary transverse sectional view on line III—III of Figure 2.
Figure 4 is a front view showing the indicating dials and illustrating the manner in which our device may be combined with the speedometer with which automobiles are now customarily equipped, and indicating how the two indicating devices may be simultaneously driven from the same driving shaft.

Referring to the drawings in detail, the numeral 1 designates the frame of a motor vehicle which is supported through the usual spring construction upon the front wheels 2 and the rear wheels 3. Upon the frame is mounted the internal combustion motor 4 which is designed to propel the vehicle and which takes fuel from a gasolene tank 5 hung at the rear of the frame. In the particular construction shown it will be observed that the level of the gasolene tank is below that of the motor, and therefore some intermediate mechanism is necessary to force the gasolene from the storage tank at the rear to the carbureter 6 where it is converted into an explosive mixture which enters the motor through the intake manifold 7. As the device for furnishing a constant supply of gasolene to the carbureter, we have shown the vehicle equipped with what is widely known in the trade as a "Stewart vacuum tank" 8. This tank, as shown in Figure 2, consists of an outer shell 9 which is suitably suported upon the vehicle as by means of a pair of straps 10 and 11. Within this tank is an inner tank 12 which is normally clamped in position by means of the top 13. The top is tightly sealed to the upper rim of the inner tank so that with it, it forms an air-tight chamber. The pipe 14 leads from the gasolene storage tank at the rear of the car to a connection 15 in the top of the inner tank, which in turn communicates with the outer tank through valve 16. As is well known, this vacuum device is provided with a second pipe 17 connecting the inner tank with the inlet manifold 7 of the motor, and a third pipe 18 through which gasolene is supplied by gravity from the outer tank to the carbureter. This device requires no detailed description, as its operation and construction are well known in the art, other than to say that through the suction created by the partial vacuum periodically occurring in the inlet manifold and communicated to the inner tank by the pipe 17, gasolene is drawn into the inner chamber 12 of the Stewart tank until the level in this chamber rises to such a point that the float 19 which is a measure of that level, shuts off the suction by closing a valve 20 and opens a valve 21, thus connecting the inner chamber with the atmosphere through a pipe 22. Thus the definite measured quantities of gasolene which has collected in the inner tank while the float was rising is allowed to flow freely into the outer tank and from it to the carbureter. It will be appreciated that during the period when the inner tank is being filled with gasolene, no gasolene is flowing from it into the outer tank, and that correspondingly during the period when the inner tank is emptying its contents into the outer tank, no gasolene is flowing into the inner tank. From this it results that at each cycle of operations of the Stewart tank a substantially definite quantity of gasolene is drawn into the inner tank and later discharged into the outer tank. Therefore, this device forms essentially a measuring instrument for the gasolene or other liquid fuel, intermittently drawing a predetermined quantity of gasolene from the storage tank 5 through the pipe 14. Consequently, it is evident that by counting the number of times that the tank operates, the quantity of gasolene consumed may be readily ascertained, and as a corollary, that by observing the distance traveled during the interval between two consecutive operations or functionings of the Stewart tank, we are enabled to ascertain the distance that the vehicle has traveled while consuming a measured and known quantity of gasolene, namely, that amount which is drawn into the inner tank each time it operates.

In Figures 2 and 3 we have illustrated one specific way of indicating or registering the functioning of the Stewart tank. This consists in inserting in the pipe line 14 a valve consisting of an outer casing 25, the ends of which are in free communication with the cut ends of the pipe 14. This casing comprises essentially a cylinder 26 in which is adapted to reciprocate a closely fitting piston 27. When the vacuum tank is in such condition that it is not drawing gasolene, so that there is no flow through the pipe 14, the lower edge 28 of this piston comes to rest against the seat 29 in the cylinder wall, thus shutting off communication between the upper and lower sections of the pipe 14. When, however, the vacuum tank is in condition to draw gasolene from the storage tank 5, by reason of a state of partial vacuum existing in the inner tank 12, a reduction of pressure occurs which is communicated through the upper section of the pipe 14 to the cylinder 26 above the piston 27. Since the gasolene or other fuel in the storage tank is subjected to atmospheric pressure, there will be an immediate tendency for the gasolene to rush from the storage tank through the lower section of the pipe 14 into the cylinder 26 to destroy the partial vacuum. The unbalanced pressure to which the opposite heads of the piston 27 are thus subjected results in the piston rising in the cylinder to substantially the position shown in Figure 2. When this occurs the lower head of the piston uncovers a port 30 leading to a by-pass 31 which extends to the upper end of the cylinder. The result is that the gasolene flows through the by-pass into the upper section of the pipe 14 and thence into the inner tank 12 until the float 19 rises to such a point that the valve 20 controlling the connection between the pipe 17 and the vacuum tank closes and the second or atmospheric valve 21 opens, restoring a condition of atmospheric pressure within the inner tank 12. It will therefore follow that during the entire interval when gasolene is flowing from the storage tank into the inner chamber of the vacuum tank, the piston 27 will be in the position shown in Figure 2 of the drawings. As soon, however, as the float 19 has passed its critical position and has actuated the valves associated with the vacuum tank so as to admit atmospheric pressure to the tank 12, the column of gasolene which fills both sections of the pipe 14 as well as the cylinder 26 and the by-pass 31 tends to flow by gravity back into the main tank 5. This produces a reverse condition of unequal pressure on the two heads of the piston 27, the greater pressure being upon the upper head, and this difference in pressure, which may be assisted by the force of spring 32 which is attached to a stem 33 secured to the piston in any suitable manner, and also by the weight of the piston, restores the piston to its lowest or initial position, in which the edge 28 again comes to rest against the seat 29. In this position it will be obvious that the lower piston head again covers the port 30 leading to the by-pass.

The net result of this series of operations is that each time the vacuum tank commences to draw gasolene from the storage tank, the stem 33 associated with the piston 27 will rise into the position indicated in Figure 2, and will remain in that position as long as the vacuum tank continues to draw gasolene. The instant the gasolene supply is automatically checked by the operation of the float, the stem 33 will move downwardly a distance equal to the travel of the piston in its cylinder. We may, therefore, utilize the movement of the stem 33 as an indication of the beginning of a cycle of operations of the vacuum tank, and since each such cycle of operations represents the drawing into the vacuum tank of a definite quantity of gasolene from the storage tank, which in turn is caused by the comsumption of an equal amount of gasolene by the motor, it necessarily follows that each time the stem 33 moves it represents an interval during which the motor has consumed a definite amount of fuel.

In the construction of a device for indicating directly the mileage for a given unit of fuel, such as miles per gallon of gasolene, not only must the gasolene be measured, but the mileage or space traveled by the car must be taken into consideration, and it is by a measurement and proper integration of these two factors, namely, the consumption of gasolene and the mileage, that we produce an instrument indicating directly miles-per-gallon.

To measure the mileage, any connection with the wheels of the vehicle, or with the driving shaft of the transmission, may be utilized, such as is now commonly used in driving speedometers or odometers. For the purposes of illustration we have shown a gear 40 (see Figure 1) moving with one of the front wheels. Meshing with this gear is a smaller gear 41 which drives a flexible shaft 42 which may directly enter the indicator, as shown in Figures 2, 5, 6 and 7, or which may also be used to drive a speedometer 43, as illustrated in Figure 4, in which case suitable gearing may be employed to drive a counter-shaft 44 which, in turn, operates through other suitable gears to rotate a shaft 45 entering the fuel consumption indicator 46.

Figure 5:
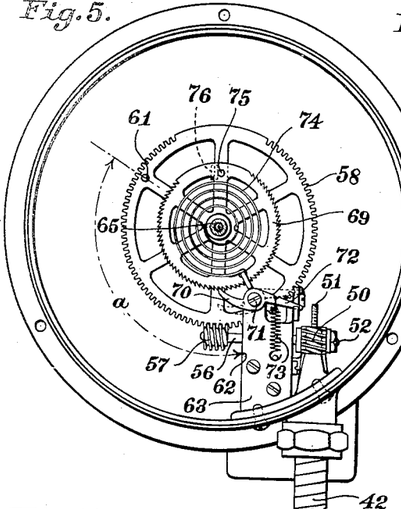
Figure 5 is a front elevation on an enlarged scale showing the indicating mechanism with the dial and pointer removed.
Figure 6:
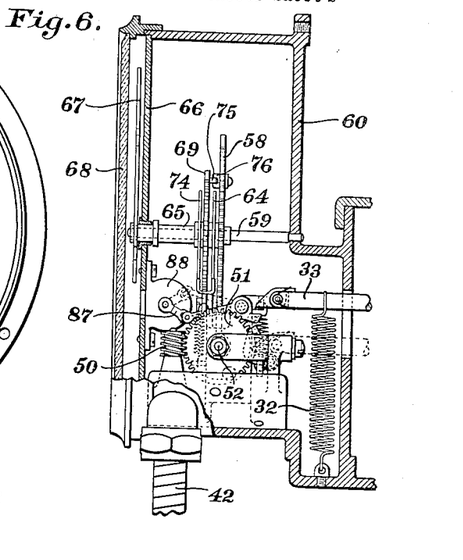
Figure 6 is a side elevation of the device of Figure 5, the casing being broken away for purpose of illustration.
Figure 7:
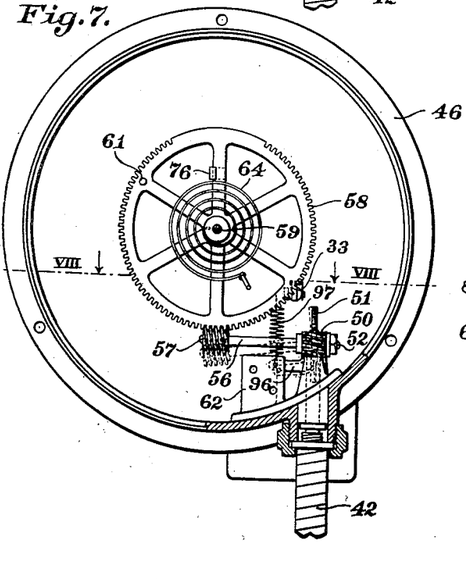
Figure 7 is a view similar to Figure 5 with the hand propelling mechanism and its supporting frame removed.
Figure 8:
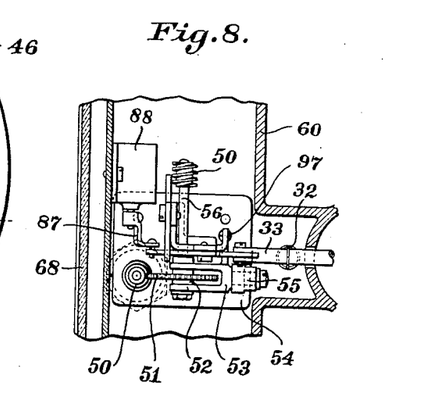
Figure 8 is a fragmentary horizontal view on line VIII—VIII of Figure 7 with the large gear wheel and its spring removed.

Referring specifically to Figures 5 to 8, inclusive, the flexible shaft 42 (either directly or indirectly, as through the counter-shaft 44, previously described) drives the worm 50 which meshes with a gear 51 mounted on a shaft 52 journaled in the two arms of a fork 53. The stem 54 of this fork projects through a housing 55 and is freely rotatable therein about its longitudinal axis. The shaft 52 is provided with an extension 56, which carries on its outer end a worm 57 meshing with a gear 58 mounted on a shaft 59, which is journaled in the instrument casing 60. The gear 58 is preferably adapted to rotate freely upon the shaft 59, although it will be obvious that the gear may be fixed to the shaft 59 and the latter provided with suitable bearings in the casing. It will thus be seen that as long as the worm 57 is in mesh with the teeth of the gear 58, any movement of the vehicle will produce a corresponding rotation of the gear 58; consequently the angle through which the gear 58 is rotated in any interval is a measure of the mileage covered by the car during such interval. Supposing the initial or zero position of the gear 58 to be such that the pin 61 projecting from the face of the gear is in engagement with the face 62 of the standard 63, then Figures 5 and 7 illustrate a condition in which the vehicle has been propelled along a distance which corresponds to the arc $a$ and of which that arc is a definite measure. If the vehicle had gone further, the arc $a$ would have been greater, and if the vehicle had gone a shorter distance the arc $a$ would have been less. Through the provision of the rotatably mounted fork 53, however, the worm 57 is not in continuous engagement with the teeth of the gear 58, but is adapted periodically to be thrown out of engagement with the teeth and into the position illustrated by the dotted lines in Figure 7. This action is possible since there is always a slight play in this direction between a gear such as the gear 51 and the threads of a worm, such as the worm 50. Each time the worm 57 is thrown out of engagement with the teeth of the gear 58 by mechanism which will be described later, the gear 58 is caused to return to its initial position in which the pin or stop 61 engages the face 62 of the standard 63, by means of a hair spring 64. A sleeve 65 is mounted on the shaft 59 and freely rotates upon it. The forward end of this sleeve projects through the dial plate 66 and carries the hand 67 which is adapted to play over the scale and which is visible through the crystal 68. The inner end of the sleeve 65 carries a ratchet wheel 69, the ratchet teeth of which are adapted to engage a pawl 70 pivoted at 71 upon the standard 63 and having an oppositely-extending arm 72 provided with a spring 73 which is adapted to hold the pawl in engagement with the ratchet teeth. A hair spring 74 tends to turn the ratchet wheel 69, and consequently the hand 67 associated with it, in a counter-clockwise direction with reference to Figure 5, but under normal conditions any movement in a counter-clockwise direction is prevented by the engagement of the pawl 70 with the ratchet teeth on the periphery of the wheel 69. The wheel is provided with a rearwardly-projecting pin 75 which is adapted to be engaged by a lug 76 projecting forwardly from the gear 58. The relative position of the pin 75 and the lug 76 is such that supposing the two to be in contact, any movement of the lug in a clockwise direction with reference to Figure 5 will move the pin 75 through a like arc, but the lug is free to move in a counter-clockwise direction without affecting the position of the pin and the ratchet wheel which carries it. Supposing, then, that the gear 58 is in its initial position with the pin 61 engaging the face 62 of the standard 63, and the lug 76 to be in engagement with the pin 75, any movement of the vehicle will be communicated to the gear 58 through flexible shaft 42, worm 50, gear 51, shaft 56, and worm 57. Such a movement of the gear 58 will cause a corresponding movement of the ratchet wheel through the engagement of the lug and the pin, and will also cause the hand 67 to move through an equal arc on the scale. The reduction in movement afforded by the gearing interposed between the vehicle and the gear 58 may be such that the scale over which the hand 67 plays can be calibrated directly in miles.

In order that the reading of the hand upon the scale shall be not only miles, but miles per gallon of fuel consumed (or for that matter any other unit of fuel) it is only necessary that the travel of the gearing 58 shall extend through a period which is coincident with the consumption of a measured quantity of the fuel, such, for instance, as a gallon or any fraction thereof.

The portions of our device shown in Figures 5 to 8, inclusive, which have so far been described, will be seen to consist of a train of mechanism adapted to cause an indicating means such as the hand 67 to travel over the face of a dial in accordance with the mileage or distance traveled by the car, measured in any suitable unit.

We will now describe the mechanism by which the mileage indicator is reset and corrected at each cycle in the operation of the fuel measuring device, whereby the mileage indicated by the hand 67 represents the mileage obtained from a given quantity of fuel, such as a gallon. This mechanism consists first of means for restoring the gear 58 to its initial or zero position with the pin 61 in contact with the abutment 62 at a point in each cycle in the operation of the measuring device, and, second, the bringing of the ratchet wheel 69, and consequently the hand actuated by it, into a position coinciding with the position of the gear 58 at an instant just prior to the resetting of such gear, and retaining the ratchet wheel 69, and consequently the hand actuated by it, in that position until the next cycle of operations. The position in which the gear 58 and the ratchet wheel 69 are together, or in phase, is obviously that in which the pin 75 engages the lug 76, as shown in Figures 5 and 6. The mechanism for producing this sequential resetting of the device is actuated in one type of our instrument by the downward movement of the stem 33 and four consecutive positions of this stem and its associated mechanism are shown on an enlarged scale in Figures 9 to 12 inclusive.

We prefer to utilize the downward movement of the stem 33 for the reason that during this movement no gasolene is being pumped from the storage tank into the mechanism, and consequently any slight pause which may be necessary to the proper sequence in the actuation of the two resetting devices will not affect the full opening of the piston valve 27 during the interval when gasolene is being drawn through such valve, it being obvious that the rapidity with which the valve 27 returns to its seat and closes the port 30 is of no consequence in the operation of the vacuum tank.

Figure 9:
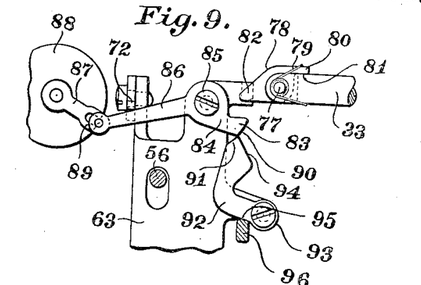
Figures 9 to 12, inclusive, are side elevations on a greatly enlarged scale of a portion of the mechanism illustrated in Figure 6 and showing the consecutive positions of this mechanism during the operation of the instrument.
Figure 10:
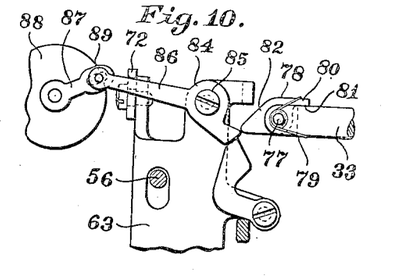
Figure 11:
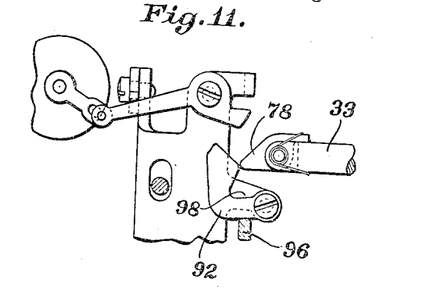
Figure 12:
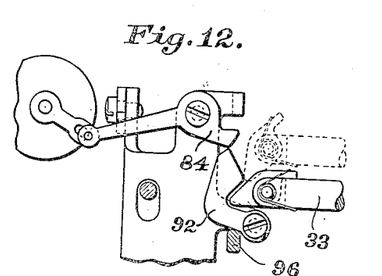

Referring specifically to Figures 5 to 12, inclusive, the stem 33 has pivoted at its outer end at 77 a tapered pawl 78 which is normally held in the position shown in Figure 9 by means of the spring 79. This pawl is provided with an extending arm 80 which is designed to abut against the portion 81 of the extending end of the stem 33, and which prevents the outer end of the pawl from tilting upward away from the stem, but the construction is such that the pawl is free to tilt downwardly about its pivot into the position shown by the dotted lines in Figure 12, except for the light spring 79 which normally holds it in a position in line with the stem 33. The position of the stem and pawl with reference to the other parts at the instant when the vacuum tank is drawing gasolene from the storage tank is shown in Figure 9. When the stem starts to descend the tip 82 of the pawl engages the arm 83 of a lever 84 pivoted at 85 to the standard 63. The engagement of the pawl with the arm 83 forces the arm downwardly into the position shown in Figure 10, lifting the other arm 86 of the lever. This arm is always in engagement with the pawl-arm 72. Consequently, the raising of the arm 86 lifts the pawl-arm 72 against the force of the spring 73 and disengages the pawl 70 from the ratchet teeth on the periphery of the ratchet wheel 69. The ratchet wheel is then free to move under the influence of the hair spring 74. The result is that if the pin 75 is not already in contact with the lug 76 the ratchet wheel and pin will move in a counter-clockwise direction with reference to Figure 5 until the pin and lug come into engagement. The lug will then prevent any further travel of the ratchet wheel 69, and the ratchet wheel and gear 58 will thus be brought into phase. The upward movement of the arm 86 also actuates the lever 87 of a counter 88 to which it is attached by means of a pin and slot connection at 89. This counter is therefore actuated each time the vacuum tank operates and may be calibrated directly in gallons or other units, and will therefore show at all times the total consumption of fuel. The initial movement of the stem 33 which brought the parts into the position shown in Figure 10, caused the curved edge 90 of the arm 83 of the lever 84 to come into contact with an adjacent curved edge 91 of a lever 92 pivoted to the standard 63 at 93. This action temporarily locks the lever 92 against movement in a downward direction with reference to Figure 10, owing to the engagement of the abutting surfaces 90 and 91. The further travel of the stem 33 and the pawl 78, however, causes the tip of the pawl to pass out of contact with the extending end of the arm 83, with the result that the spring 73 quickly restores the lever 84 and parts operated by it to their initial position, thus bringing the pawl 70 again into engagement with the ratchet teeth upon the periphery of the ratchet wheel 69. As soon as the arm 83 of the lever 84 has resumed its usual position, the lever 92 is free to move in a downward direction, and further travel of the stem 33 and the pawl carried by it causes the engagement of the tip of the pawl with the inclined edge 94 of the lever 92. This forces that lever into the position shown in Figure 11. The lower edge 95 of the lever 92 is constantly in engagement with an arm 96 projecting from and integral with the yoke 53. Consequently, the downward movement of the lever 92 forces the arm 96, together with the spring 97 (see Fig. 7), also connected to the arm 96, into the position shown in Figure 11, and this accomplishes the slight tilting of the yoke 53 which is sufficient to bring the worm 57 out of engagement with the teeth of the gear 58, as shown in dotted lines in Figure 7. It will be appreciated that at this instant the pawl 70 has also reengaged the nearest tooth of the ratchet wheel 69 and any movement of the latter is thereby checked. Consequently, the sole effect of the disengagement of the worm 57 from the teeth of the gear 58 is to permit the hair spring 64 to restore the gear 58 to its initial or zero position, namely, with the pin 61 in engagement with the abutment 62. By the time the stem 33 reaches the position shown in Figure 11, it has almost but not quite come to the end of its downward travel. The completion of its travel brings it into the position shown in full lines in Figure 12, in which it will be seen that the tip 82 of the pawl 78 travels beyond the edge 94 of the lever 92 and enters into the V-shaped opening or cutaway portion 98 thereof. As a result, the lever 92 is once more free to return to its initial position, under the influence of the spring 97, and the parts come to rest in the position shown in full lines in Figure 12, wherein it will be seen that both the levers 84 and 92 and all their associated mechanism have come back to the positions originally occupied as shown in Figure 9. When the vacuum tank again operates to draw gasolene from the storage tank, the piston valve 27 will be rapidly lifted against the force of the spring 32, as already described, and will raise the stem 33 from the position shown in full lines in Figure 12 to the position shown in Figure 9. This movement is not restricted by the engagement of the pawl 78 with either of the levers 92 or 84, since, as already explained, the pawl is free to move downwardly with respect to the stem 33 and does so, as indicated in dotted lines in Figure 12, thus readily slipping past both levers, which it, however, actuates on its downward travel.

The sequence of events which results from the operation of the parts just described is as follows: Suppose a vehicle to which the instrument is connected to start moving at an instant when the vacuum tank has just drawn in a charge of gasolene from the storage tank, and when the stem 33 has dropped into the position illustrated in Figure 12, and suppose also that the gear 58 is in its initial position with the pin 61 in engagement with the abutment 62 and that at this same instant the pin 75 is in engagement with the lug 76; in this position the hand 67 will be at the zero indication on the scale 66. As the vehicle travels the gear 58 will be also rotated in a clockwise direction with reference to Figures 5 and 7 by means of the flexible shaft 42, worm 50, gear 51 and worm 57. As soon as the pin 75 and lug 76 are in contact, the ratchet wheel 69 will be carried around synchronously with the gear 58, the pawl 70 slipping over the ratchet teeth of the ratchet wheel 69, as the latter moves in a clockwise direction. Any movement of the ratchet wheel is communicated to the hand or pointer 67, and the latter moves over the face of the dial indicating directly the number of miles traveled by the vehicle. This action will continue until the gasolene level in the inner chamber of the vacuum tank drops to such a point that the vacuum tank operates to draw gasolene from the storage tank. The only effect of this will be to bring the stem 33 into its uppermost position without affecting any of the other parts, and the hand will continue to travel across the face of the dial. As soon, however, as the vacuum tank is filled and ceases to draw gasolene any longer, the piston valve drops carrying with it the stem 33. The first action produced by this is the momentary disengagement of the pawl 70 with the teeth on the ratchet wheel 69 and the actuation of the counter 88. Since the pin 75 is in engagement with the lug 76, however, there will be no movement of the ratchet wheel 69 upon the disengagement of the pawl 70. By virtue of the interlocking of the levers 84 and 92, already described, the pawl 70 will return into engagement with the teeth of the ratchet wheel before the worm 57 is thrown out of engagement with the teeth of the gear 58. This disengagement which immediately follows the re-engagement of pawl 70 with the teeth of the ratchet wheel 69 produces the effect of restoring the wheel 58 to its initial position with the pin 61 in engagement with the stop 62. Supposing the vehicle to have traveled 15 miles in the interval described, the pointer will now stand at the 15 mark on the dial, and will remain there although the gear 58 has returned to its initial position. This is by reason of the fact that the pawl 70 has returned into engagement with the teeth of the ratchet wheel 69 before the gear 58 was released and permitted to fly back to its initial or zero position.

The disengagement of the worm 57 from the teeth of the gear 58 is only momentary and is just sufficient to permit the gear to return to its zero position, so that the further travel of the vehicle again causes the gear 58 to rotate slowly from its zero position in a clockwise direction with reference to Figures 5 and 7. The upward movement of the stem 33 will not affect the position of the other parts of the instrument, but as soon as the vacuum tank has again filled, the stem 33 will start on its down stroke and as before the first action will be to release the pawl 70 from the teeth of the ratchet wheel 69. Suppose that in the interval between the first and second strokes of the stem 33, the vehicle has traveled 13 miles instead of 15, as during the previous corresponding interval, then at the moment when the pawl 70 is disengaged from the teeth of the ratchet wheel 69, the lug 76 will not yet have reached the position of the pin 75, so that the disengagement of the pawl 70 from the ratchet wheel 69 will cause the wheel to fly back under the influence of the hair spring 74 until the pin 75 does engage the lug 76. The pointer will now stand over the 13 mark on the dial, and it will thus be seen that the instrument has corrected itself so as to show the actual mileage passed over during the last interval. Immediately the pawl 70 returns into engagement with the teeth of the ratchet wheel 69, and the further travel of the stem releases the worm 57 from engagement with the teeth of the gear 58, as before, and the latter flies back to its zero position, the worm 57 immediately re-engaging with the teeth of the gear 58 and the instrument is in position to start off upon a new cycle of operations. If, instead of traveling 13 miles during the interval just considered, the vehicle had traveled, say, 20 miles, then the lug 76 will have caught up with and will have come into engagement with the pin 75, at some time previous to the down stroke of the stem 33. As soon as the gear 58 advances beyond the position corresponding to 15 miles, the lug 76 now being in engagement with the pin 75 will carry the latter and consequently the ratchet wheel 69 and the hand 67 around with it, so that at the instant the stem 33 starts on its down stroke, the hand registers 20 miles on the dial and stops in this position, since the momentary engagement of the lug 76 with the pin 75 prevents any counterclockwise movement of the ratchet wheel 69 when the pawl 70 is momentarily disengaged. It will thus be seen that no matter whether the mileage in any interval is the same as that during the previous interval, or is greater or less than the mileage of the preceding interval, the position of the hand upon the dial will correctly indicate the actual mileage traveled by the vehicle during the interval under consideration.

In the above description it has been assumed that at each operation of the vacuum tank the latter draws a unit amount of fuel, such as a gallon, from the storage tank, but, as a matter of fact, the vacuum tanks commonly in use draw only a small fraction of a gallon at each operation; consequently, instead of the travel of the hand 67 across the dial being at a rate which is equal to the mileage, it will be at a rate which is multiplied by a factor equal to the number of operations of the vacuum tank necessary to draw a unit (gallon) of fuel from the storage tank, and, on the other hand, instead of the counter 88 registering a gallon on each down stroke of the stem 33, it will register the fraction of the gallon which the vacuum tank draws from the storage tank at each operation.

Figure 13:
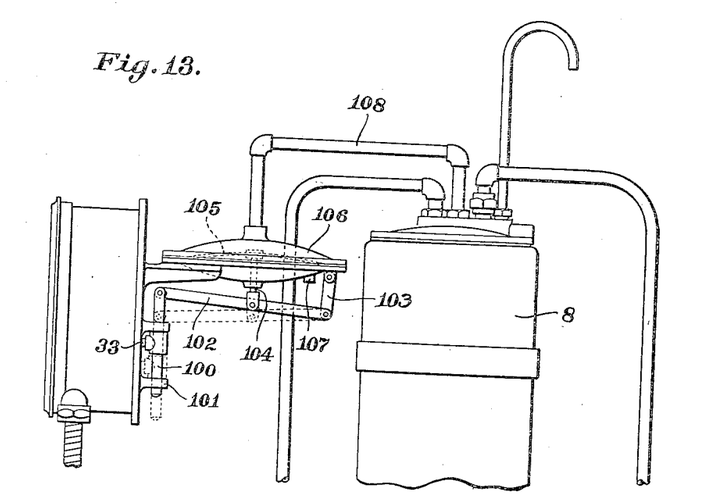
Figure 13 illustrates a modified form of the device.

In Figure 13 a modified construction is illustrated in which the instrument, instead of being actuated by the flow of fuel or by means in connection with the fuel line, is operated directly by the vacuum created in the vacuum tank through suitable instrumentalities such as a diaphragm or other pressure device. As shown in this figure, the instrument is of the construction already described and is provided with the stem 33 which operates the interior mechanism as set forth. This stem is carried by a slide 100, which is movable up and down in guides 101 and which is actuated by a lever 102, the latter being pivoted at one end to a link 103 and being engaged at an intermediate point of its length by a connecting rod 104, which is arranged to be operated by the diaphragm 105 which is contained within the casing 106. One side of the diaphragm is subjected to atmospheric pressure through a vent 107, while the casing at the other side of the diaphragm is in constant communication with the inner chamber of the vacuum tank 8 through a pipe 108. As will be understood from the description of the vacuum tank already given, conditions of vacuum and atmospheric pressure alternately obtain in this inner chamber in accordance with the movements of the float. When a vacuum exists in this chamber air is exhausted from the casing 106 above the diaphragm and the latter then occupies the upwardly bent position shown in dotted lines in Figure 13, and the stem 33 is at the same time lifted up by this movement. When atmospheric pressure is admitted to the inner chamber it also finds its way to the casing above the diaphragm and the latter will be moved downwardly by its own resiliency or by the action of a spring engaging the stem 33 as already described, or otherwise placed whereby the stem 33 will move to its lower position. Thus it will be seen that the movements of the stem are controlled in accordance with the movements of the float in the vacuum tank, and consequently are dependent on the fuel consumption, as already explained.

Figure 14:
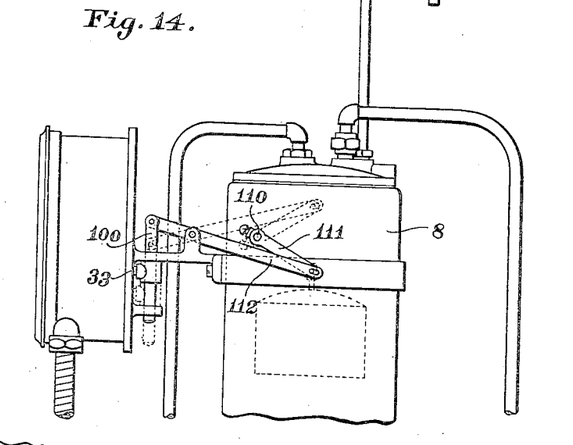
Figure 14 illustrates a further modification.

Figure 14 shows another modification of our invention in which the instrument is operated by direct mechanical connection with the float. As illustrated, this is accomplished by projecting the shaft 110 of the lever arm to which the float is connected, through the side of the vacuum tank, and mounting on the projecting portion a lever 111. The latter is connected by a pin and slot connection to a lever 112, which operates the slide 100 carrying the stem 33. The movements of the float are thus transmitted directly to the stem. Obviously any other suitable connecting means might be employed.

Figures 15, 16:
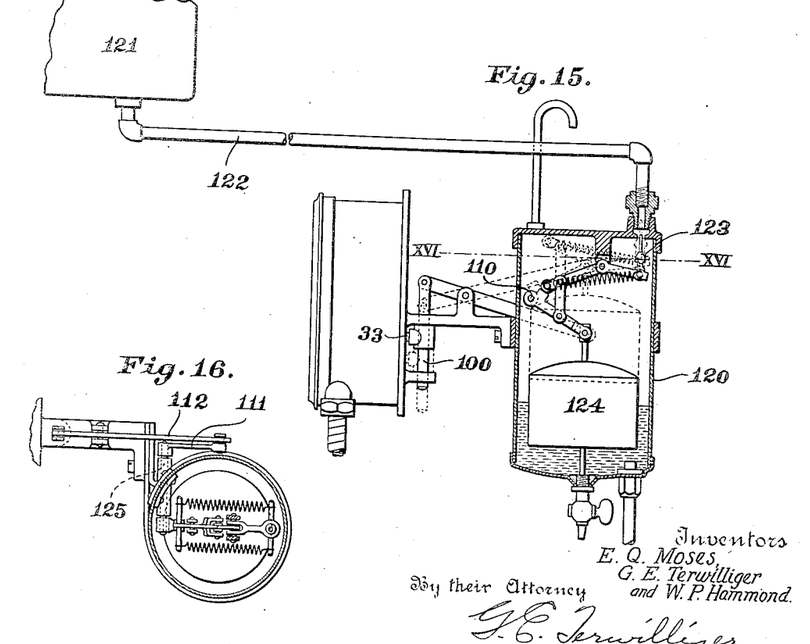
Figure 15 shows the device applied to a vehicle using the gravity type of liquid-fuel feed.
Figure 16 is a transverse sectional view on line XVI—XVI of Figure 15.

In Figures 15 and 16 we have shown how our invention may be employed in connection with a fuel supplying system which does not embody a vacuum tank. In order to accomplish this, any form of fuel meter may be employed, the meter being so arranged as to control the resetting devices of the instrument. As shown, a simple float meter 120 is utilized but obviously any other suitable type of meter could be substituted for this. In the construction illustrated the fuel is fed by gravity from the tank 121 through a pipe 122 to the chamber of the meter, valve 123 controlling the inlet opening to the chamber. This valve is operated through suitable links and levers from the float 124. The shaft 110 of the float carrying lever is carried through the side of the chamber as in the construction shown in Figure 14 and is connected by levers 111 and 112 with the slide 100 carrying the stem 33. The shaft 110 is preferably journaled in a long sleeve 125 which forms a substantially tight bearing. A similar construction for mounting the shaft is preferably employed in connection with the vacuum tank as shown in Figure 14. It will be seen that the float 124 when in its lower position as shown in full lines in Figure 15 opens a valve 123 and permits the meter chamber to be filled up. When the float rises to its dotted line position it acts to close the valve, at the same time moving down the stem 33. The float will move down to a position to open the valve 123 and actuate the mechanism every time a definite quantity of fuel has been discharged from the meter chamber, so that the instrument will be operated at the proper intervals, as already described.

While certain preferred embodiments of the invention have been shown and described in detail by way or illustrating the principle thereof and the best mode now known to us for practicing the invention, it will be understood that the invention may be carried out in other ways and by other mechanism than that illustrated, and that it may be employed in various relations, such, for example, as measuring the fuel consumption of boats, aeroplanes, stationary engines or other apparatus, or may be utilized for measuring the consumption of other materials than fuel, such for instance as lubricating oil, feed or cooling water, etc.

Having thus described our invention, we claim:

1. Means for resetting the reading of gear driven distance indicator devices for motor vehicles which comprises providing a double worm gear reduction drive as a part of the device, a pivoted bearing mount for the second of said worm gears, and a lever means periodically operated by the vacuum feed device of the motor of said vehicles to engage and rotate said pivoted bearing mount to momentarily disengage the said second worm gear from further parts of the indicating mechanism driven thereby.

2. The internal combustion engine fuel consumption meter mechanism which comprises a releasable double reduction worm gear drive from the engine mechanism, a spur gear normally actuated by said drive in a clockwise direction against spring pressure, a ratchet wheel driven by said spur gear also in a clockwise direction and against spring pressure, a pawl means for retaining said ratchet wheel in the position assumed under the spur gear drive and mechanically interlocked means for successively releasing and reapplying said pawl and said worm gear drive to permit spring retraction of said spur gear and wheel, and lever mechanism for actuating said releasing means from fuel feed tank operation.

3. In an indicator control means for internal combustion engine fuel meters employing mechanical drive, a pawl controlling the resetting of said indicator, a pawl operating lever, an indicator drive disengaging lever, interlocknig means for preventing simultaneous operation of said levers and means actuated by the operation of a fuel feed tank to successively engage said levers for the purpose of disengaging said pawl and said drive and of resetting said indicator.

4. Internal combustion engine fuel meter indicator mechanism comprising a journaled casing containing a worm gear driven from a part moved by said engine, an intermediate gear affixed to a pivotedly mounted intermediate shaft and continuously meshing with said first worm gear, a second worm gear also fixed to the said intermediate shaft, a pivotedly mounted forked bearing support for said intermediate shaft, an indicator journal shaft rotatably supporting a spur gear provided with spring means tending to rotate it in a clockwise direction and with an abutment, said journal shaft also supporting an independently rotatable sleeve having a ratchet wheel and an indicator hand affixed thereto, said ratchet wheel provided with spring means tending to turn it counterclockwise, with an abutment, and with pawl-engaging teeth, a pawl pivotedly mounted upon an internal projection of the said casing and in normal engagement with the teeth of said ratchet wheel, a lever pivoted upon a further portion of said projection in actuating engagement with said pawl, the whole in combination with a disengaging stem reciprocated by the periodic changes occuring in the fuel feed tank of the aforesaid engine, the first said worm gear serving to rotate said intermediate gear and therethrough said intermediate shaft, together with the second worm gear thereon, said second worm gear normally engaging the teeth of said spur gear to rotate it in a clockwise direction against the aforesaid spring, said spur gear abutment engaging the abutment on said ratchet wheel to transmit thereto its clockwise motion, said ratchet wheel transmitting its motion through said sleeve to the aforesaid indicator hand and normally retained against the action of its spring by the aforesaid pivoted pawl, said reciprocated disengaging stem on its downward stroke serving to depress the aforesaid lever, thereby releasing the ratchet wheel from its holding pawl to permit the ratchet wheel spring to turn it backward until stopped by the contact of the ratchet and spur gear abutments, said disengaging stem serving upon further movement to again apply the ratchet wheel holding pawl and to thereafter rotate said pivoted bearing to successively disengage and engage said worm gear with said spur gear, the intervening period between said disengagement and engagement permitting the spur gear spring to rotate it backward to its starting point to effect reoperation upon further fuel consumption of the aforesaid engine.

5. In a distance indicating device for motor vehicles, a driven member, a driving connection to drive said member in accordance with the travel of the vehicle and indicator controlling member driven by said driven member, spring means to return said driven member and said indicator controlling member toward their starting point, pawl and ratchet means to normally prevent return of the indicator controlling member and lever means actuated periodically by the vacuum feed device of said vehicle for temporarily releasing said pawl and temporarily disconnecting said driving connection to permit the return of said driven member, means to restore said pawl before the disconnection of said driving connection and means to restore said driving connection.

EDMUND QUINCY MOSES.
GERALD E. TERWILLIGER.
WILLIAM P. HAMMOND.